United States Patent [19]
Mackin, Jr.

[11] 3,797,533
[45] Mar. 19, 1974

[54] FOOD TREATMENT PROCESS AND APPARATUS

[76] Inventor: John J. Mackin, Jr., 907 E. Mason St., Green Bay, Wis. 54301

[22] Filed: July 3, 1972

[21] Appl. No.: 268,492

[52] U.S. Cl. .................. 141/1, 302/14, 141/67, 214/17 D
[51] Int. Cl. ............................... B65b 1/00
[58] Field of Search ............. 302/14, 15, 16, 2; 214/309, 310, 17 D, 17 C; 141/67, 1

[56] References Cited
UNITED STATES PATENTS

| | | | |
|---|---|---|---|
| 2,513,004 | 6/1950 | Cooley | 302/15 X |
| 1,507,864 | 9/1924 | Smith | 302/14 X |
| 3,260,389 | 7/1966 | Paton | 214/310 |
| 3,098,571 | 7/1963 | Fehr | 214/17 C |
| 1,744,363 | 1/1930 | Chapman | 214/309 |
| 914,475 | 3/1909 | Beduwe | 302/14 X |

Primary Examiner—Richard E. Aegerter
Assistant Examiner—H. S. Lane
Attorney, Agent, or Firm—Andrus, Sceales, Starke & Sawall

[57] ABSTRACT

Brine treated cucumbers and the like are removed from the treating vat by flushing with additional brine from a receiving tank and providing a suitable transfer passage from the vat to the tank.

The vat has a generally conical cover sealed with the sides and with an outlet connection for a pipe to conduct overflow brine and cucumbers to a receiving tank.

5 Claims, 6 Drawing Figures

PATENTED MAR 19 1974 3,797,533

FOOD TREATMENT PROCESS AND APPARATUS

BACKGROUND OF THE INVENTION

This invention relates to a process and apparatus for treating cucumbers and the like as in pickling with a salt brine.

Heretofore it has been customary to employ large circular open top wood vats into which the cucumbers or other material to be treated is loaded and leveled and covered with brine, after which a loose flat wooden top is weighted to press down on the material.

When the fermentation and treatment are complete the top is removed and the cucumbers or other material being treated are removed by dip nets or special conveyors, leaving the brine in the vat. Sometimes shovels are employed and air lances may be necessary to dislodge the cucumbers.

The above procedure has generally left the vats exposed to rain, snow, dust, vermin, flies, and various pollutants which often contaminated the brine and sometimes the treated material.

Various attempts have been suggested to provide a sealed top for the vat without changing the essential steps of the process. The loading, leveling and unloading steps have all remained as crude as ever.

Furthermore, there has always remained a question as to the virtue or necessity of keeping the vat open for sunshine to reach the material being treated and for air to get to the brine and gases to escape freely therefrom.

Sanitation has thus been wanting in both the pickling and krauting processes.

SUMMARY OF THE INVENTION

The present invention provides protection from contamination, a greater tank capacity, and improved handling procedure whereby a more sanitary treatment is obtained with less chance of damage to the cucumbers or other food material being treated.

In carrying out the invention the vat is provided with a generally frusto-conical top sealed or integral with the side walls to protect the contents from contamination and increase the capacity of the vat, and connections with the vat and top are utilized to provide a novel unloading procedure.

The unloading procedure involves a closed circuit system wherein brine is pumped from a receiving tank into the vat to raise the level of the contents in the vat into the neck of the roof from whence it flows by conduit to the receiving tank. In this process the cucumbers or other treated material are floated and flushed along with the brine into the receiving tank which then retains the same while the clear brine is continually pumped from the receiving tank into the vat.

Air lances may be employed in the vat to loosen and dislodge any cucumbers or other material and the contents of the vat may be additionally agitated by the velocity of brine flow to facilitate removal of all of the cucumbers or other material from the vat.

When the vat is empty the brine may be removed therefrom preparatory to a fresh loading of the vat for another cycle of treatment.

The invention in an apparatus sense further contemplates the construction of integral tops and/or vats from concrete or molded glass fiber reinforced synthetic plastic material, lined with epoxy or other easily cleanable protective coating. Where the frusto-conical top is employed as a cover on an otherwise open top wooden vat the edges are sealed with the upper side walls of the vat. Where the vat and top are integral the upper neck in the top has to be of a size to provide for ready loading of the vat with cucumbers or other material to be treated and may have a removable reasonably tight or sealed cover thereon.

The slant of the cover should accommodate the normal peak of a pile of cucumbers as the latter are loaded by gravity at the center of the vat, thus avoiding the necessity for leveling the cucumbers and increasing the capacity of the vat.

BRIEF DESCRIPTION OF THE DRAWING

The drawings furnished herewith illustrate the best mode presently contemplated by the inventor for carrying out the invention.

In the drawings.

DESCRIPTION OF THE PREFERRED EMBODIMENTS

Figure 1:
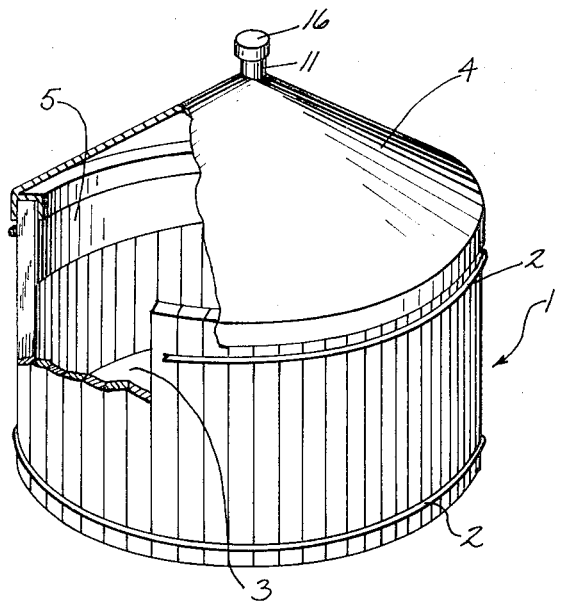
FIG. 1 is a perspective view of a wooden food treating vat with parts broken away and sectioned to show the construction.
Figure 6:
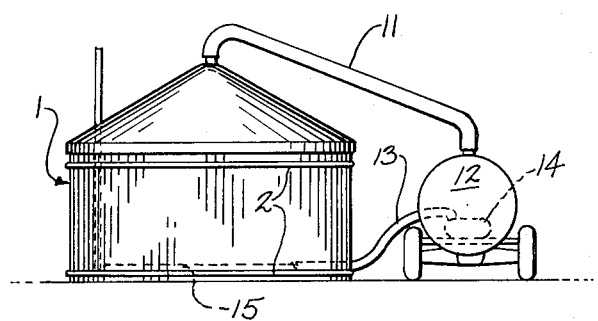
FIG. 6 is a side elevation showing the apparatus for unloading as in FIG. 5.
Figure 5:
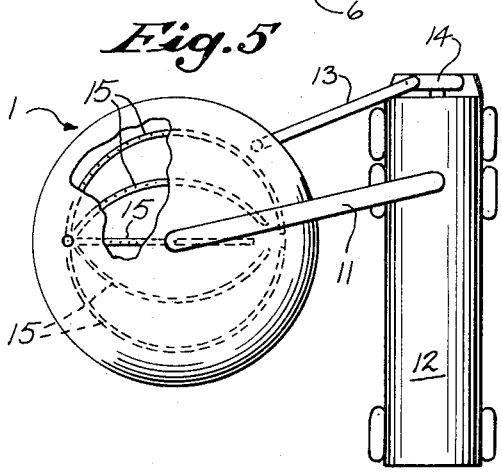
FIG. 5 is a top plan view showing schematically the construction for unloading as applied to a vat of the FIG. 1 construction.

In FIGS. 1, 5 and 6 the construction utilizes the former circular wood stave vat with metal hoops 2 for retaining the staves in place, and the usual wood floor 3.

A frusto-conical top 4 is supported on the upper edge of the staves of vat 1 and sealed thereto by any suitable means. Where the top rests on top of the vat it may be sealed thereto by epoxy or other sealing compound therebetween. Where the top 4 is of the nominal inside diameter of the vat 1 it may be sealed thereto by a flexible skirt 5 which is either biased against or secured to the inner wall of the tank.

The top 4 may be made of various materials such as stainless steel, fiberglass reinforced plastic, lightweight concrete, rubber or synthetics and should be reasonably rigid and strong to withstand the head of brine employed in unloading.

Figure 2:
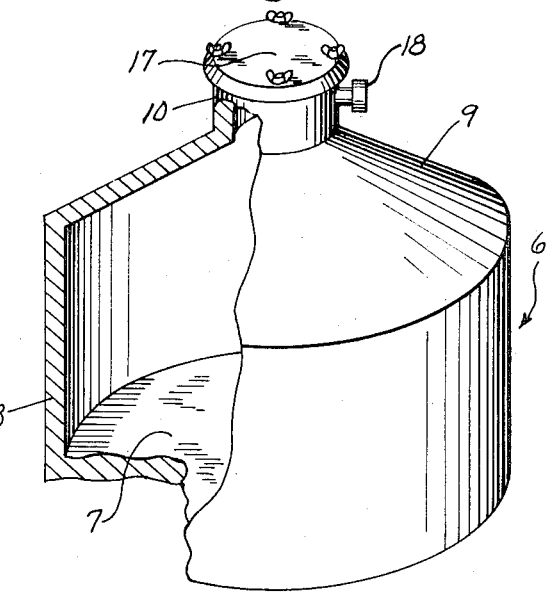
FIG. 2 is a perspective view of an integral type of vat with parts broken away and sectioned to show the construction.
Figure 3:
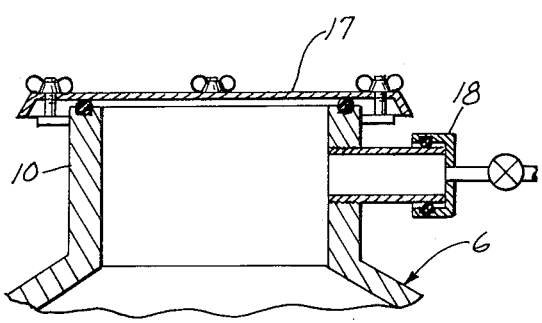
FIG. 3 is a detail enlarged vartical section taken axially of the top portion of a vat of the construction of FIG. 2 with the vat loaded.
Figure 4:
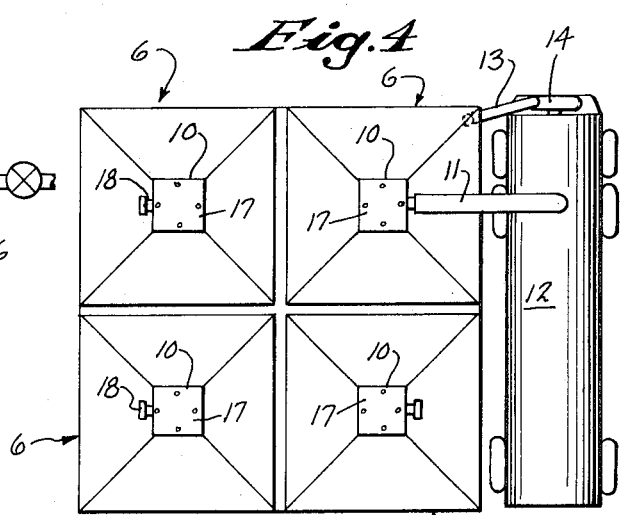
FIG. 4 is a schematic top plan view of a multi-vat construction showing schematically the construction for unloading as applied to one of the vats.

In FIGS. 2, 3 and 4 the entire vat 6 is constructed of concrete or fiberglass molded plastic in one piece and has a floor 7, vertical side walls 8, a frusto-conical top 9 and a vertical neck 10.

The vat 6 may be constructed in multiple units each of a generally rectangular shape in plan view, FIG. 4 showing four such vats with common walls.

The neck 10 is of manhole size to facilitate loading and unloading and provide access to entering the vat for cleaning and other purposes.

In the construction of FIGS. 1, 5 and 6 the entire cover 4 is removed for loading the vat 1 with cucumbers, whereas in the construction of FIGS. 2, 3 and 4 the vat 6 is loaded with cucumbers through the neck 10.

In both constructions the cucumbers or other material to be treated need not be leveled but may remain piled to the height of the top 4 or 9 and in conformance therewith as when loaded by gravity at the center of the vat.

After the vat 1 is loaded the top 4 is positioned and sealed in place, after which brine is added to cover the cucumbers completely. In the case of the construction of FIGS. 2, 3 and 4, after the vat 6 is loaded brine is added to cover the cucumbers completely.

In the case of FIGS. 1, 5 and 6, where the cucumbers are leveled after loading the vat, the cover 4 need not be positioned thereon until it is desired to unload the vat, treatment being completed according to prior practices wherein the material or cucumbers are covered with brine and a temporary flat hold-down cover is employed.

During the treatment period which may extend from 1 to 3 or more months, the cucumbers or other material will ferment and become changed chemically, in which processes the gases may be given off and the liquid level of the brine may change both up and down.

For this purpose provision should be made for the escape of gases at the apex of top 4 and through the neck 10. Likewise the apex of top 4 and the neck 10 should be of sufficient capacity to confine the brine as the brine level rises.

The system of unloading is greatly improved over the former crude methods.

For this purpose a discharge overflow conduit 11 is connected to the apex of top 4 or to the neck 10, depending upon the construction employed.

The conduit 11 discharges into a receiver tank 12, usually a mobile portable tank on a truck for delivering the treated product to a processing or packing station.

The tank 12 may be initially filled with brine and connected by conduit 13 to the vat 1 or 6 near the corresponding floor 3 or 7.

A pump 14 in conduit 13 will force a flow of brine from tank 12 into the bottom of the vat 1 or 6 beneath the cucumbers or other treated material, and thence upwardly in the vat to overflow through discharge conduit 11 back into the tank 12.

The flow of brine should be fast enough to agitate the contents of the vat and to lift the cucumbers toward and into the overflow conduit 11 so that there is a continuous movement of cucumbers from the vat into tank 12 where they become trapped.

If needed pre-positioned air lances 15 may be provided in the vat beneath the cucumbers or other material to assist in dislodging the same for unloading thereof.

The process is thus continued until the vat 1 or 6, as the case may be is empty of cucumbers or other treated material and is full of brine only, and the tank 12 is filled with cucumbers or other treated materials generally submerged in brine, at which time the unloading process is generally complete.

The tank 12 is then disconnected from the vat and may be transported to its destination.

The vat may then be emptied of brine and cleaned for another cycle of treatment.

The unloading process greatly simplifies the unloading and is much less apt to damage the treated cucumbers or other material being unloaded.

The apparatus may be sealed against contamination of the contents of the vat during the treatment process.

For this purpose the connection for discharge conduit 11 to top 4 at or near the apex of the latter may be closed by any suitable means such as a cover 16 when conduit 11 is disconnected therefrom.

Likewise a cover 17 may be applied to the top of neck 10 and a cover 18 may be applied to the opening in the side of neck 10 in place of the connection for conduit 11 thereto.

If it is desired that the rays of the sun reach the top of the cucumbers in either vat 1 or vat 6 a portion of the top 4 or 9, or of the neck 10 or cover 17 may be constructed of a transparent plastic or other material.

Various modes of carrying out the invention are contemplated as being within the scope of the following claims particularly pointing out and distinctly claiming the subject matter which is regarded as the invention.

I claim:

1. In the treatment of solid vegetable matter as in the pickling of cucumbers and the like, the unloading of treated solid material from a vat having upwardly extending side walls wherein the material is submerged in a liquid such as brine, comprising establishing a continuous rapid flow of liquid upwardly from the bottom in the vat to a central overflow discharge therefor which converges from said side walls upwardly, whereby the material is gradually carried upwardly by the flow and concentrated as it approaches the point of discharge.

2. The process of claim 1 wherein a closed circuit flow of liquid is provided between the vat and a receiving tank, and a pump is employed to effect the necessary liquid flow to transfer material from the vat through said discharge to the receiving tank.

3. Apparatus for treating solid food material by submerging the same in a liquid such as brine, comprising a vat with upwardly extending side walls for receiving the material by gravity from above, closed cover means for said vat of generally frusto-conical shape extending upwardly from said walls to an upper overflow discharge to accommodate the material in its natural outline and provide for a level of liquid above the peak of the material within said cover, and means to establish a continuous flow of liquid upwardly from near the bottom in the vat to said upper overflow discharge of said cover means to concentrate and more rapidly move said material through said discharge in unloading the material from the vat.

4. Apparatus in accordance with claim 3 in which said flow establishing means comprises a receiving tank filled with liquid, pump means for forcing liquid into the lower region in the vat from said receiving tank, and a discharge conduit from said vat discharge to said tank.

5. Apparatus for the treatment of solid vegetable matter as in the pickling of cucumbers and the like, comprising a vat having upwardly extending side walls for receiving the material to be treated and for submerging the same in a treatment liquid, an upwardly extending, generally frusto-conical cover sealed on the top of said walls and providing a central overflow discharge opening at the crown thereof, a separate receiving tank adapted to initially contain a liquid, pump means connected between said tank and vat for forcing liquid from said tank into the lower region of said vat to displace the material and treatment liquid therein, and a transfer conduit connected between said central overflow discharge opening in said cover and said tank for discharge of material and liquid from said vat to said tank.

\* \* \* \* \*